United States Patent [19]  [11]  4,074,168
T'Jampens  [45]  Feb. 14, 1978

[54] HALOGEN INCANDESCENT LAMP WHOSE FILLER GAS COMPRISES BROMINE, CHLORINE AND HYDROGEN

[75] Inventor: Germain Remi T'Jampens, Eindhoven, Netherlands

[73] Assignee: U.S. Philips Corporation, New York, N.Y.

[21] Appl. No.: 511,056

[22] Filed: Oct. 1, 1974

[30] Foreign Application Priority Data

Oct. 10, 1973 Netherlands ............ 7313906

[51] Int. Cl.$^2$ ............................................. H01K 1/50
[52] U.S. Cl. ............................................. 313/222
[58] Field of Search ............................. 313/222, 223

[56] References Cited

U.S. PATENT DOCUMENTS

| 3,418,512 | 12/1968 | T'Jampen et al. ........... 313/222 X |
| 3,484,146 | 12/1969 | Meijer et al. .................. 316/20 |
| 3,586,896 | 6/1971 | Meijer et al. ............... 313/222 X |
| 3,719,853 | 3/1973 | Sugano et al. ............... 313/222 |

*Primary Examiner*—Palmer C. Demeo
*Attorney, Agent, or Firm*—Frank R. Trifari; Robert S. Smith

[57] ABSTRACT

Halogen incandescent lamp having a gas filling comprising dibromonethane ($CH_2Br_2$) and carbontetrachloride ($CCl_4$).

3 Claims, No Drawings

HALOGEN INCANDESCENT LAMP WHOSE FILLER GAS COMPRISES BROMINE, CHLORINE AND HYDROGEN

The invention relates to a halogen incandescent lamp comprising carbon, bromine, chlorine and hydrogen and furthermore a rare gas and/or nitrogen.

Such incandescent lamps are known, for example, from U.S. Pat. No. 3,484,146. This Patent describes a halogen incandescent lamp comprising chlorine and bromine in a ratio of 1 : 1. Hydrogen is present in a quantity in gram atoms which is equal to the total quantity of halogen in gram atoms. Such a lamp comprises, for example, monobromomonochloromethane ($CH_2BrCl$). As compared with a lamp exclusively comprising bromine and hydrogen, such a lamp according to this Patent has the advantage that the total quantity of halogen may be lower and that the lamp can be vertically operated without this having any influence on the cycle. Furthermore there are advantages of a technological nature. Since bromochloromethane has a vapour pressure which is approximately three times higher than dibromomethane, the filler gas reservoirs for the same percentage of halogen hydrocarbon compound can be filled to a pressure which is three times higher.

Such incandescent lamps are likewise known from U.S. Pat. No. 3,719,853. This Patent describes relatively low-power lamps with a long lifetime having a gas filling likewise comprising bromine, chlorine and hydrogen obtained by filling the lamp with a mixture of a rare gas or nitrogen, monobromomethane ($CH_3Br$) and dichloromethane ($CH_2Cl_2$). As regards the total quantity of halogen in gram atoms these lamps comprise an excess of hydrogen while according to the examples no special preference is given to the ratio between bromine and chlorine.

It has been found that particularly in high-power halogen lamps certain phenomena may occur during their lifetime which result in a relatively short average lifetime of these lamps.

In high-power lamps, i.e. lamps having a filament temperature of 3200° K or over it is necessary to use a larger quantity of halogen so as to ensure a complete retransport of tungsten evaporated from the filament than in the case of low-power lamps. The reason thereof is that the quantity of evaporated tungsten per unit of time and consequently the quantity of tungsten to be transported is larger in the former case than it is in the latter.

In these high-power lamps blackening of the wall of the envelope is found to occur after a relatively short time followed by blow-up and ultimate leakage of the envelope for gas fillings comprising more halogen dosed as dibromomethane or monobromomonochloromethane. The said blackening is found to consist mainly of tungsten, tungsten carbide and carbon which is released during the decomposition of the halogen hydrocarbon compounds used for dosing the required hydrogen and halogen. In these lamps the mechanical strength of the filament is also found to decrease as the filler gas comprises more carbon.

Very short lifetimes may occur when halogen incandescent lamps are successively switched on and off quickly for comparatively long periods such as is conventional practice in slide projection and reproduction equipment. Failure of the lamp is caused by sagging of the coiled filament followed by a short circuit of the central turns.

An investigation of such filaments has proved that this sagging is caused by carbon being taken up therein from the transport gas such as dibromomethane and monobromomonochloromethane. A decrease in the quantity of carbon in the lamp is, however, necessarily related to a smaller halogen quantity in the lamp when using gas fillings comprising dibromomethane and monobromomonochloromethane. A decrease in the content of the said halogen hydrocarbon compounds to a level at which sagging would no longer occur is, however, impossible, for the wall of the envelope is already blackened when the content is decreased to a much lesser extent.

It is an object of the invention to provide a halogen incandescent lamp in which the described difficulties as obviated.

According to the invention this is achieved by a halogen incandescent lamp which is characterized in that the lamp comprises carbon, hydrogen, bromine and chlorine in a ratio of 1 : 1 : 1 : 2 to 1 : 1.8 : 1.8 : 0.4 while the ratio between hydrogen and bromine differs by less than 0.1 from 1 in gram atoms.

Such a lamp may be obtained by using a filling gas comprising dibromomethane ($CH_2Br_2$) and carbontetrachloride ($CCl_4$) in a molecular ratio between 1 : 1 and 9 : 1.

According to a further embodiment of the invention the filling gas may comprise monobromodichloromethane. This compound has approximately the same volatility as dibromomethane, but comprises relatively more halogen.

In the halogen lamps according to the invention the filler gas composition may be adapted within wide limits to the specific circumstances in the lamp such as the dimensions of the envelope and the performance under load of the filament.

The conventional gases such as argon and krypton may be used as a rare gas. The pressure of the filling gas may be 1 or more atmospheres. The quantity of transport gas may vary between comparatively wide limits, but in total it is generally below 1% of the total quantity of gas present in the lamp. The minimum quantity is the one at which blackening of the wall of the envelope under operating conditions is effectively prevented throughout an economic lifetime. This quantity can be experimentally determined in a simple manner.

The halogens are present in excess relative to the quantity of hydrogen in the filler gases in the lamps according to the invention, which excess generally consists of the quantity of chlorine present while the quantity of hydrogen present is substantially equal to the quantity of bromine, which quantities are expressed in gram atoms.

It is achieved that high-power lamps remain clear throughout their lifetime. In lamps operated in accordance with a given switching cycle it is found that the filament under these circumstances does not sag as a result of taking up carbon.

The invention will be described in greater detail with reference to the following examples.

Example I

This example relates to a projection lamp (24V-250W, 34 Lumens per Watt, colour temperature 3400 K) which with a gas filling having a pressure of 3 atmospheres and consisting of 0.6% dibromomethane, remainder krypton, has a lifetime of at least 50 hours. When switching on and off the lamp (on for 5 seconds and off for 5 seconds) the lifetime of this lamp is reduced to several hours. The end of the lifetime is caused by sagging of the filament followed by short circuit of several turns. Lamps filled with a gas mixture of 0.6% dibromomethane, remainder krypton up to a total pressure of 3 atmospheres are found to have an average lifetime of 4 hours when they are switched on and off. When filling these lamps according to the invention with a gas mixture comprising 0.066% of a mixture of dibromomethane and carbontetrachloride in a molecular ratio of 2:1, remainder krypton up to a total pressure of 3 atmospheres the lifetime in case of switching on and off is found to amount to approximately 60 hours at an average. A slightly better result is achieved when the same gas mixture is filled in the lamp up to a pressure of 4 atmospheres.

Similar results are obtained with a gas mixture comprising 0.044% monobromodichloromethane, remainder krypton.

For a total filling pressure of 3 atmospheres the lifetime is found to amount to 91 hours at an average in case of switching on and off.

For a total filling pressure of 5 atmospheres the average lifetime is found to be more than 110 hours.

Example II

This example relates to a photographic lamp (225 V – 1000 Watt, 34 Lumens per Watt, colour temperature 3400 K) which with a gas filling of 1% dibromomethane, 8% nitrogen, remainder argon at a pressure of 1 atmosphere has an average lifetime of 15 hours. When using a gas mixture comprising 0.14% of a mixture of dibromomethane and carbontetrachloride molecular ratio of 7:1, 8% nitrogen, remainder argon the lifetime is found to be 37.5 hours at an average at a filling pressure of 1 atmosphere.

Example III

This example relates to a projection lamp (225V-840W, 28.5 Lumens per Watt) with a lifetime of 75 hours for a gas filling of 0.8% HBr, remainder nitrogen, filling pressure 1.5 atmospheres. When using dibromomethane in an equivalent quantity relative to the quantity of HBr in this lamp, the lamp is blackened after approximately 25 hours.

When the lamp is filled with a gas mixture comprising 0.4% of a mixture of dibromomethane and carbontetrachloride in the molecular ratio of 7:1, remainder nitrogen up to a pressure of 1.5 atmospheres, the average lifetime is approximately 79 hours. When using a gas mixture comprising 0.4% of a mixture of dibromomethane and carbontetrachloride in the molecular ratio of 4:1, remainder nitrogen, filling pressure 1.5 atmospheres, the average lifetime is approximately 94 hours.

When using a gas mixture comprising 0.4% of a mixture consisting of dibromomethane and carbontetrachloride in the molecular ratio of 2:1, remainder nitrogen, filling pressure 1.5 atmospheres, the average lifetime is approximately 79 hours. Wherever hereinbefore a percentage is referred to in the description of a gas mixture, it indicates as a percentage of the filling pressure the partial pressure of the component or mixture of components in question.

What is claimed is:

1. A halogen incandescent lamp having a transparent sealed envelope, a filament supported therein, and means for supplying electric power to said filament, wherein said envelope contains carbon, hydrogen, bromine and chlorine and a gas selected from the group consisting of the rare gases and nitrogen, the ratio between said carbon, hydrogen, bromine and chlorine in gram atoms being between 1:1:1:2 and 1:1.8:1.8:0.4, and the ratio between hydrogen and bromine differing by less than 10% from 1.

2. A halogen incandescent lamp as claimed in claim 1, further including a mixture of dibromomethane and carbontetrachloride in a ratio of between 1:1 and 9:1 disposed in said envelope during initial assembly of said lamp and before operation thereof.

3. A halogen incandescent lamp as claimed in claim 1, further including bromodichloromethane disposed in said envelope.

* * * * *